United States Patent [19]

Holt

[11] Patent Number: 5,778,770
[45] Date of Patent: Jul. 14, 1998

[54] FOOD SEPARATING DEVICE

[76] Inventor: Paul Lindsay Holt, 20 Lowgon Rd., Bridlington, East Yorkshire, YO16 5LZ, Great Britain

[21] Appl. No.: 750,804

[22] PCT Filed: Jun. 28, 1995

[86] PCT No.: PCT/GB95/01512

§ 371 Date: Dec. 27, 1996

§ 102(e) Date: Dec. 27, 1996

[87] PCT Pub. No.: WO96/00511

PCT Pub. Date: Jan. 11, 1996

[30] Foreign Application Priority Data

Jun. 29, 1994 [GB] United Kingdom ............... 9413027

[51] Int. Cl.⁶ ..................... A23N 4/13; A23N 7/00
[52] U.S. Cl. .................. 99/541; 99/584; 99/588; 99/590; 99/591
[58] Field of Search ................. 99/537, 538, 539–541, 99/544, 545, 567, 584, 588, 589–591; 426/481, 441, 637, 514, 808

[56] References Cited

U.S. PATENT DOCUMENTS

| | | | |
|---|---|---|---|
| 2,015,666 | 10/1935 | Ewald | 99/590 |
| 4,383,367 | 5/1983 | Mielnicki | 99/538 X |
| 4,526,093 | 7/1985 | Fogerson | 99/584 |
| 4,770,092 | 9/1988 | Curtis et al. | 99/588 X |
| 5,181,458 | 1/1993 | Plant et al. | 99/538 |

Primary Examiner—Timothy F. Simone
Attorney, Agent, or Firm—Nikaido, Marmelstein, Murray & Oram LLP

[57] ABSTRACT

A food processing machine is provided for separating a body of a food item, for example for removing a portion of potato from its outer skin. The machine comprises a plurality of cutting means (4) arranged in an array; a plurality of receptacles (41) for containing a plurality of food items, the receptacles (41) being arranged in an array; and means for moving the cutting means (4) between a cutting position, in which the cutting means are operable to cut a body portion from each of the food items, and the release position, in which the food items are released from the cutting means.

8 Claims, 8 Drawing Sheets

FOOD SEPARATING DEVICE

The present invention relates to the field of food processing, and particularly although not exclusively to a scoop for separating a body of a vegetable or fruit from an outer skin of the vegetable or fruit, for example a potato.

In the field of food processing, there is a requirement for high volume peeling of vegetables, particularly potatoes, in order to produce mash potato products.

SUMMARY OF THE INVENTION

It is an object of the present invention to provide an apparatus which can efficiently separate a body of a food item, for example a potato from a skin of the food item, for a large volume of food items per hour.

According to one aspect of the present invention there is provided a food processing machine for separating a body of a food item, the machine comprising:

a plurality of cutting means arranged in an array;

a plurality of receptacles for containing a plurality of said food items, the receptacles being arranged in an array; and means for moving the cutting means between a cutting position, in which the cutting means are operable to cut a body portion from each of the food items, and a release position, in which the food items are released from the cutting means.

Preferably, the cutting means comprise an arced blade having first and second ends, the blade being rotatable about an axis of rotation which connects the first and/or second ends.

Preferably, the machine comprises a support means for supporting a cut food portion during transport between the cutting and release positions.

Preferably, the support means comprises an arced blade having first and second ends, the blade being rotatable about an axis of rotation which connects said first and/or second ends.

The plurality of cutting means are preferably arranged in a row, about a single axis of rotation. The support means and cutting means are preferably arranged to rotate about the same axis of rotation, such that the cutting means leads the support means in cutting through the body of the food item.

Preferably the array of cutting means are supported on a moveable gantry member, the moveable gantry member being moveable between the cutting and release positions. In the cutting position, the gantry may lie adjacent the plurality of receptacles, and in the release position, the gantry may be removed from the plurality of receptacles.

In the release position, preferably the cutting means and support means rotate with respect to the rotational axis, such as to release the body of the food item, under the influence of gravity.

In the release position, the cutting means and support means may urge a food body portion held thereby, against a pushing member, for pushing the food body away from the support means and/or cutting blade, to release the food body.

Preferably, the plurality of receptacles comprise an array of recesses on a conveyor belt. Preferably the conveyor belt moves in a series of discrete step wise movements, such as to allow location of the array of cutting means with the plurality of receptacles.

In the cutting position, preferably the gantry abuts or substantially abuts the plurality of receptacles, to prevent movement of the food items in the receptacles.

Further subsidiary features of the invention will be apparent from the following description.

DESCRIPTION OF THE PREFERRED EMBODIMENTS

Referring to FIGS. 1 to 9 of the accompanying drawings, a food processing machine according to a first specific embodiment of the present invention is shown.

The machine comprises an input conveyor belt 1 for carrying a plurality of food items, eg. potatoes, the conveyor belt comprising a plurality of conveyor sections 2, each having a tray for carrying a plurality of potatoes, the conveyor being driven in step-wise fashion underneath an overhead gantry 3, the gantry containing a plurality of rotatable blades 4, the positions of the blades being arranged to coincide with the positions of potatoes on the conveyor 1 such that each blade portion corresponds with a respective potato positioning; an output conveyor 5 for removing potato body pieces which have been scooped out of the potato skins by the rotating blade 4; a drive means, being preferably an hydraulic drive means, for raising and lowering the overhead gantry 3, for causing rotation of the rotating blades 4, and for causing step-wise movement of the first conveyor 1; and a control means for controlling the movement of the overhead gantry between the cut position in which the blades may act to scoop the central body portions of the potatoes from the potato skins, and a release position in which the gantry overhangs the output conveyor 5, and in which the blades can be rotated to release the potato body portions onto the output conveyor 5, the gantry being arranged to be swung about a pivotal axis 6 between the cutting position (see FIG. 1) and the releasing position (see FIG. 2), by the drive means and control means.

Figure 4:
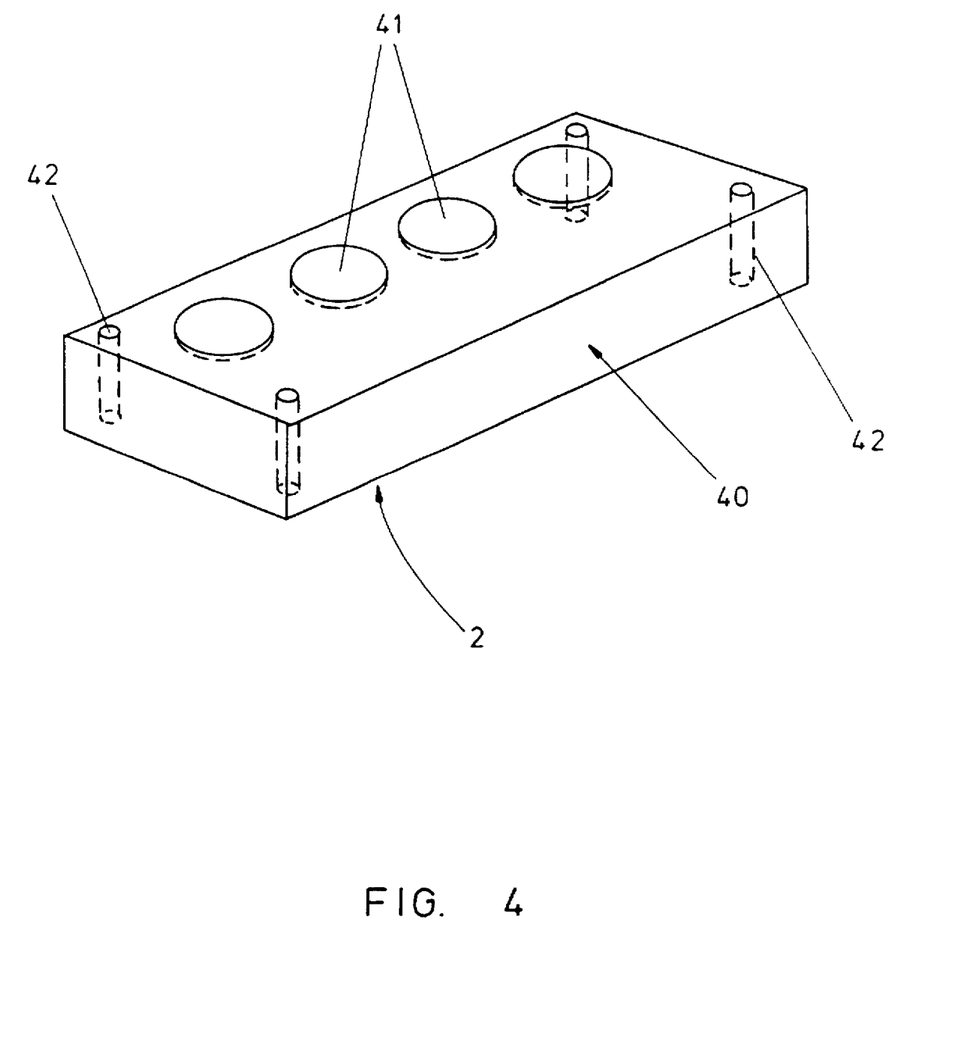
FIG. 4 shows in perspective view, a food tray, comprised in the first specific embodiment, for holding a plurality of potatoes.
Figure 5:
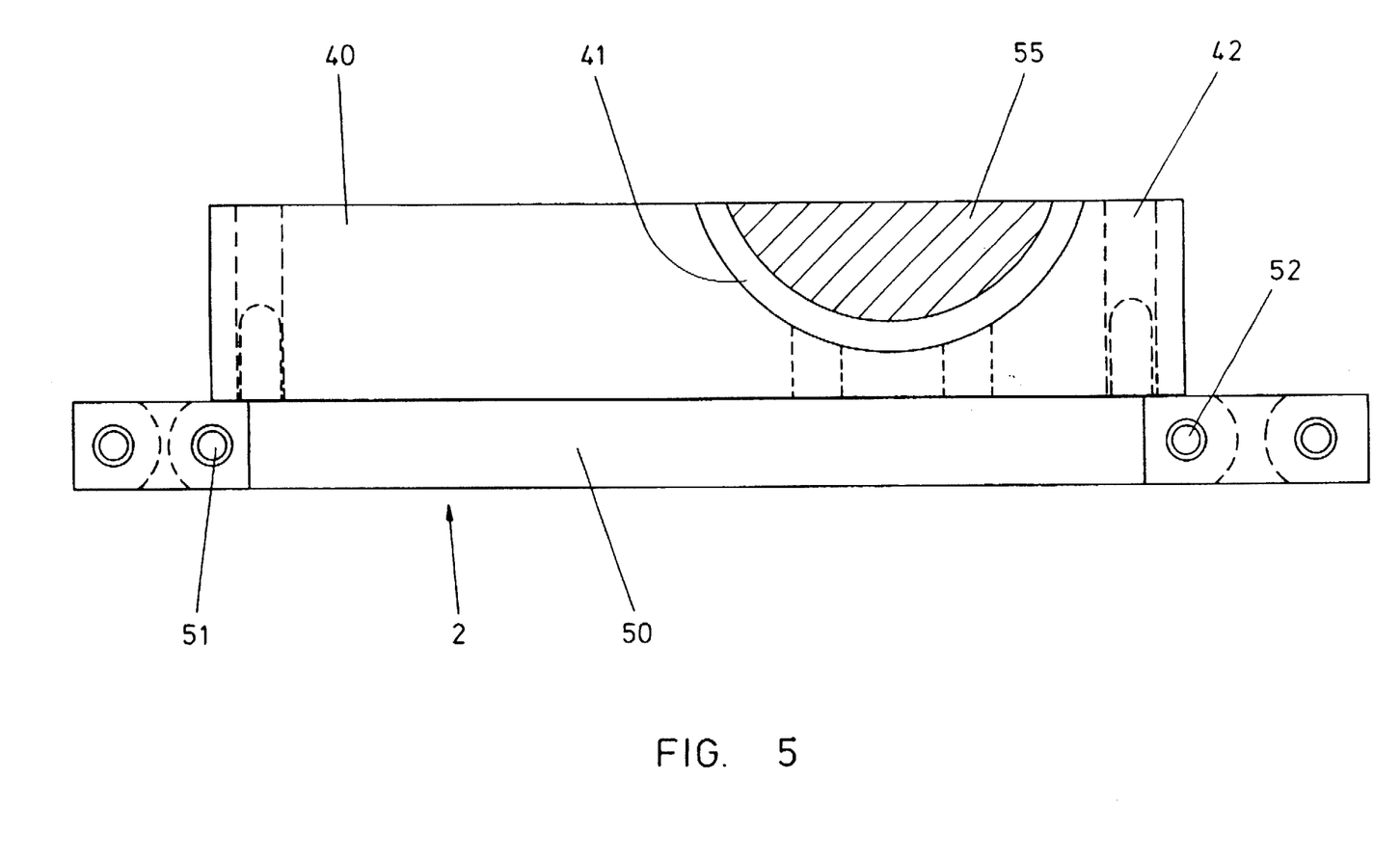
FIG. 5 shows in end view, a conveyor portion comprising the food tray of FIG. 4.

Referring to FIGS. 4 and 5 of the accompanying drawings, each conveyor section 2 of the input conveyor 1 comprises a tray 40, for example a rectangular acetal block having a plurality of recesses 41, each of hemi-ellipsoidal shape for seating a potato half therein. The block is provided with a plurality of locating apertures 42, one locating aperture at each of four corners of the rectangular block, the locating apertures being provided for attaching the block to a conveyor frame portion 50. The conveyor frame portion 50 comprises first and second elongate plates each having first and second pivotal connections, one at each of first and second ends of the plate 51,52 respectively, for linking adjacent frame portions together to form the conveyor belt.

In FIG. 5, there is shown a half potato 55, resting in a recess 41 of the tray 40. The acetal block trays are removably attached to their respective conveyor frame portions of the conveyor belt, by attachment means. The attachment means may comprise locating lugs, or a bolt, such that the trays may be removed from the conveyor frame portions for ease of cleaning.

Figure 6:
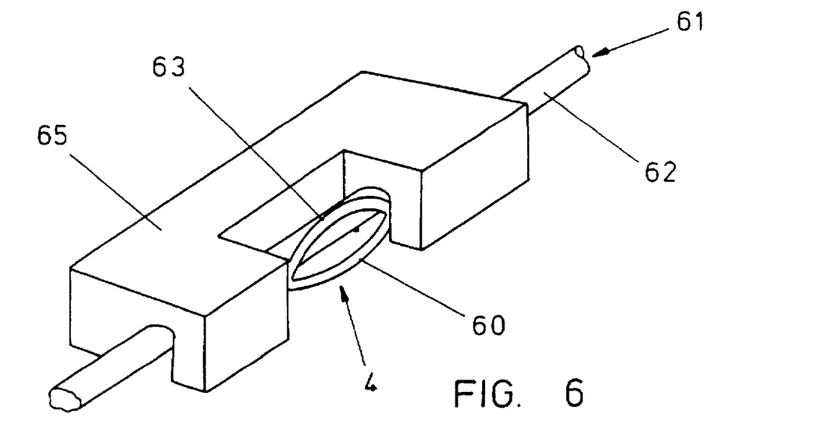
FIG. 6 shows a rotatable blade and blade gantry portion of the first embodiment.
Figure 7:
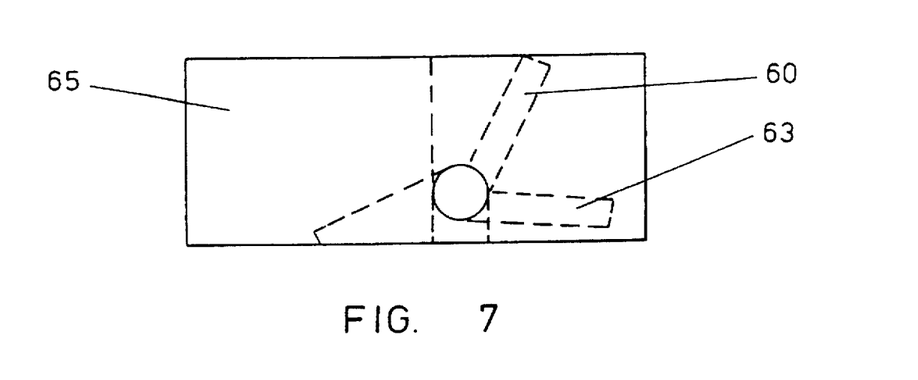
FIGS. 7 and 8 show in first and second rotational positions respectively, the rotatable blade of FIG. 6.
Figure 8:
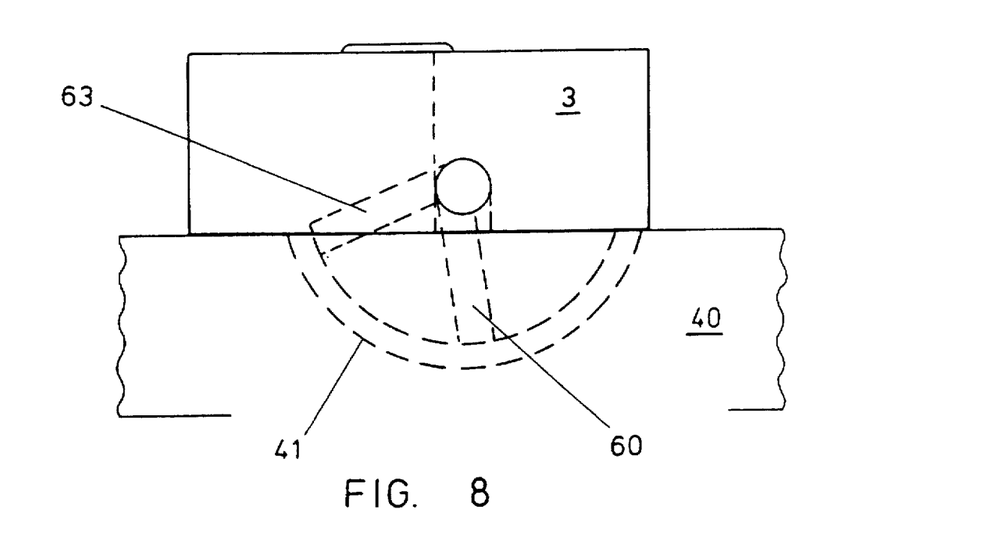

Referring to FIGS. 6 to 8 of the accompanying drawings, there is shown in perspective and end views a portion 65 of the overhead gantry 3, and a rotating blade 4. The blade 4 comprises a cutting blade 60 and a support blade 63, each arranged to rotate about a horizontal rotational axis 61, lying central to a support rod 62 to which the blades are attached, such that the cutting blade and support blade describe a path of movement about the central axis 61, as the support rod 62 is rotated. The support blade 63 is displaced radially from the cutting blade 60, by a radial angle θ. The support blade and cutting blade may be formed from a single metal piece, preferably stainless steel. The support rod 62 is also preferably of stainless steel, whilst the gantry portion 65 is preferably an acetal block.

Figure 9:
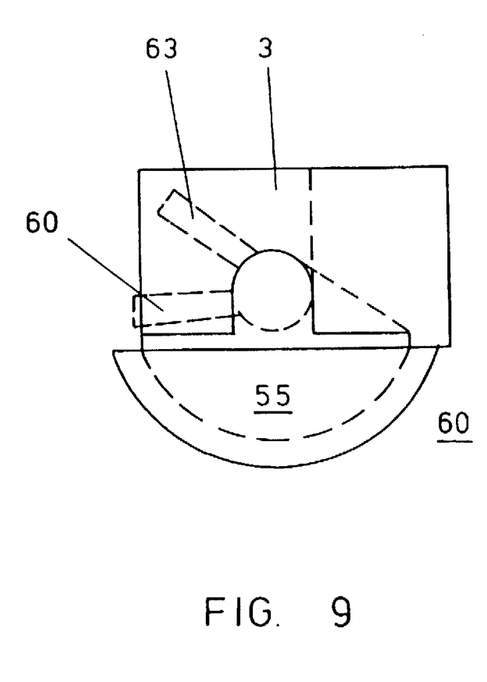
FIG. 9 shows the rotatable blade and blade gantry portion in the cut scooping position, in which the blade and gantry are adjacent a conveyor portion in the first embodiment.

Referring to FIGS. 8 and 9 of the accompanying drawings, the gantry is shown in a scooping position, in which the gantry and rotating blades are adjacent an upper surface of a tray of the input conveyor belt.

In FIG. 9, the cutting blade/support blade combination are shown in a neutral position, in which the blades do not significantly project from the gantry member 3.

In FIG. 8, the blades are shown in a scoop position, in which the cutting blade and support blade rotate about the central axis 61, to project from the gantry member 3, so that the blades describe a path of movement which follows the internal surface of the recess 41, being spaced apart therefrom by a predetermined distance. Preferably the predetermined distance is of the order of 2–10 mm. In the scooping position, the gantry member 3 closely fits over the upper surface of the tray, such that the food item, eg. a potato half, placed in a recess of the tray cannot escape from the recess. As the cutting blade rotates as shown anti clockwise in FIG. 8, to describe the path of movement which closely follows the inner surface of the recess 41, the blade cuts into the body of the potato half, whilst leaving the potato skin portion in the space between the arc of cut of the cutting blade and the surface of the recess 41. The potato half is prevented from being pushed out of the recess, by the presence of the gantry member 3 over the recess. The support blade, which follows the path of the cutting blade supports the cut out portion of potato, such that, with the cutting blade having travelled over a full cutting movement, of the order of 160°–180° (e.g. 170°) rotation about the axis 61, when the gantry is moved upwardly, the support blade supports the portion of potato body which has been cut away from the potato skin, such as to lift the cut potato body portion from the tray as the gantry rises.

Figure 1:
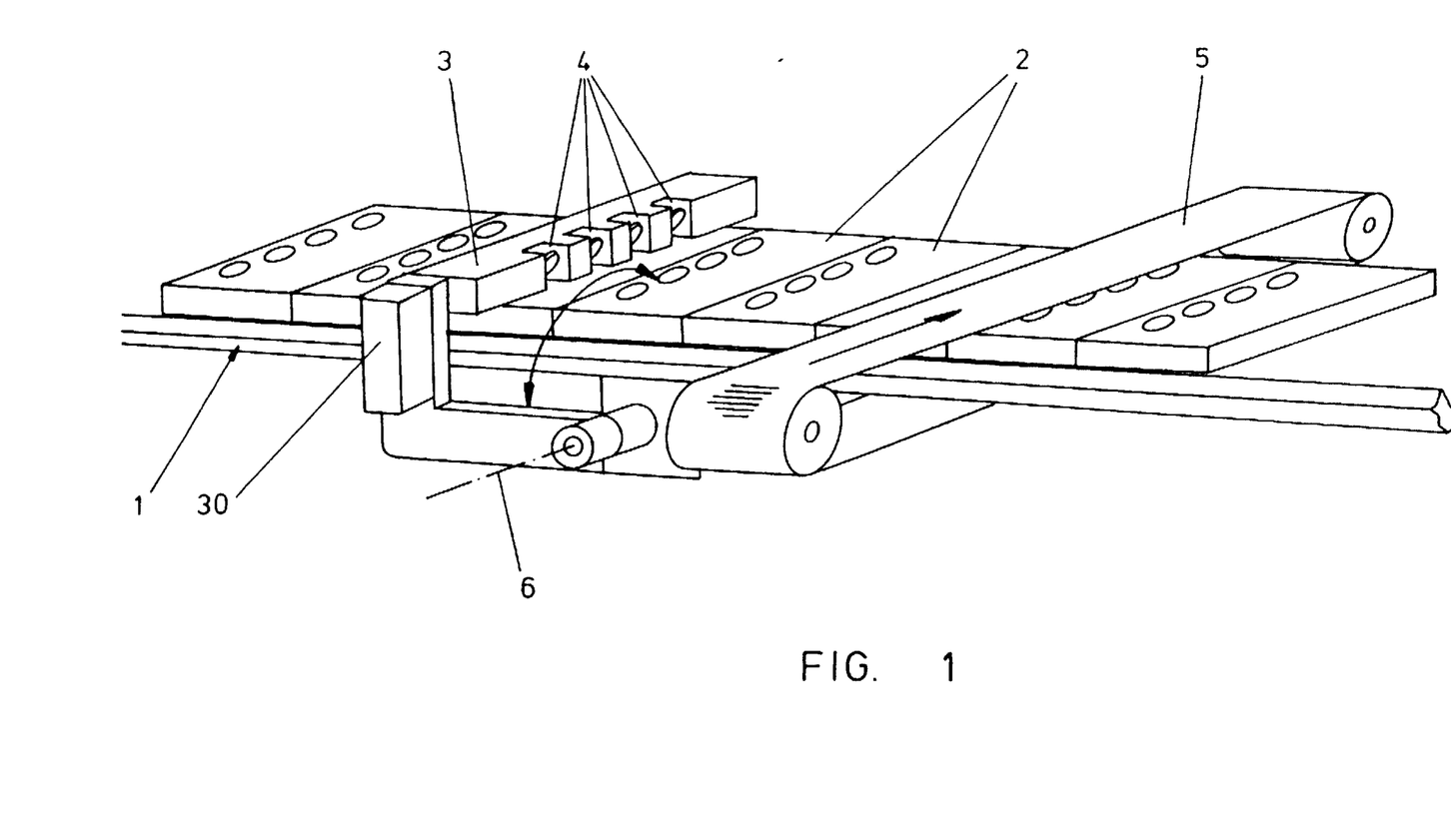
FIG. 1 shows a potato scooping machine according to a first specific embodiment of the present invention, in a cutting position.
Figure 2:
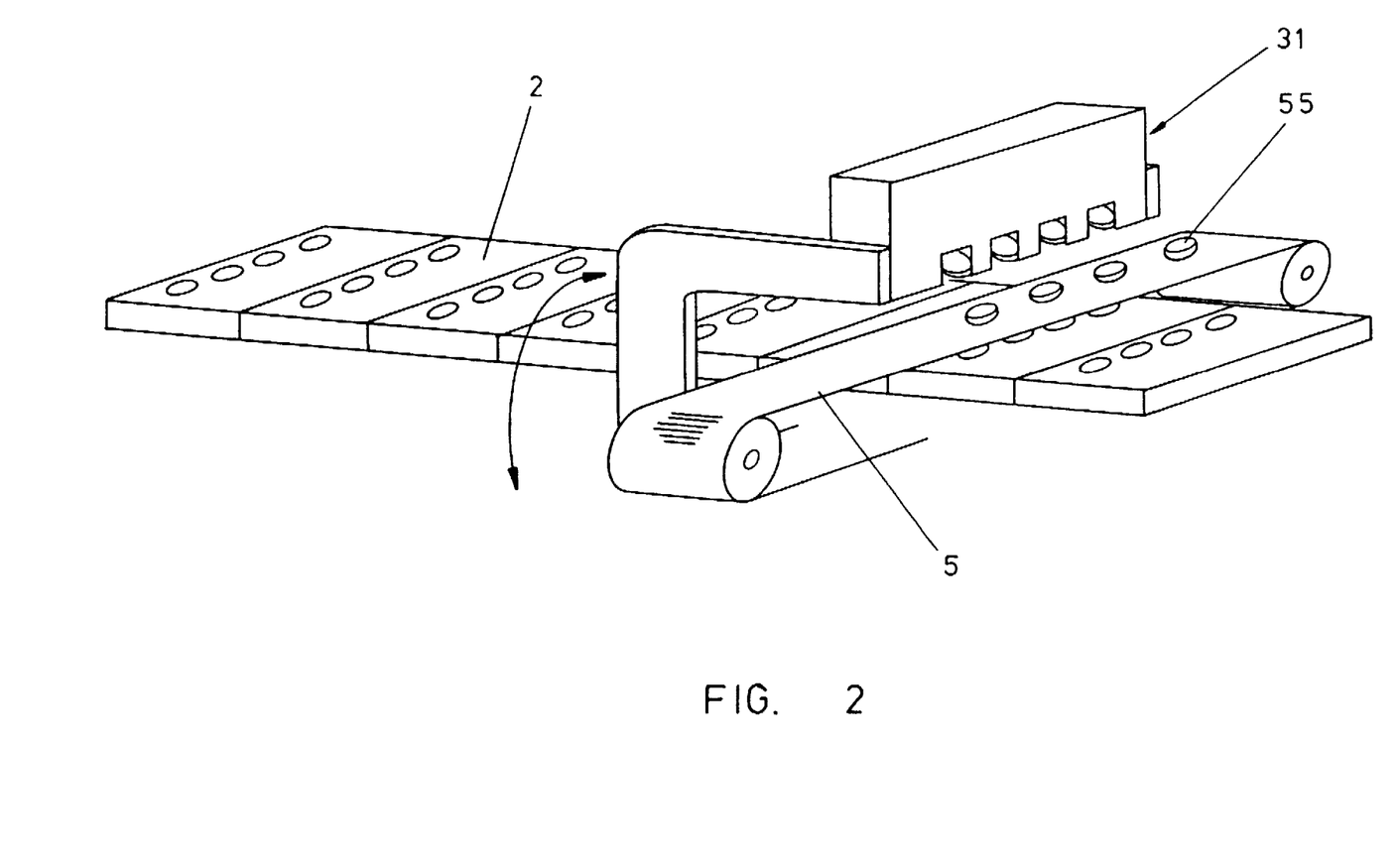
FIG. 2 shows the potato scooping machine in a potato releasing position.
Figure 3:
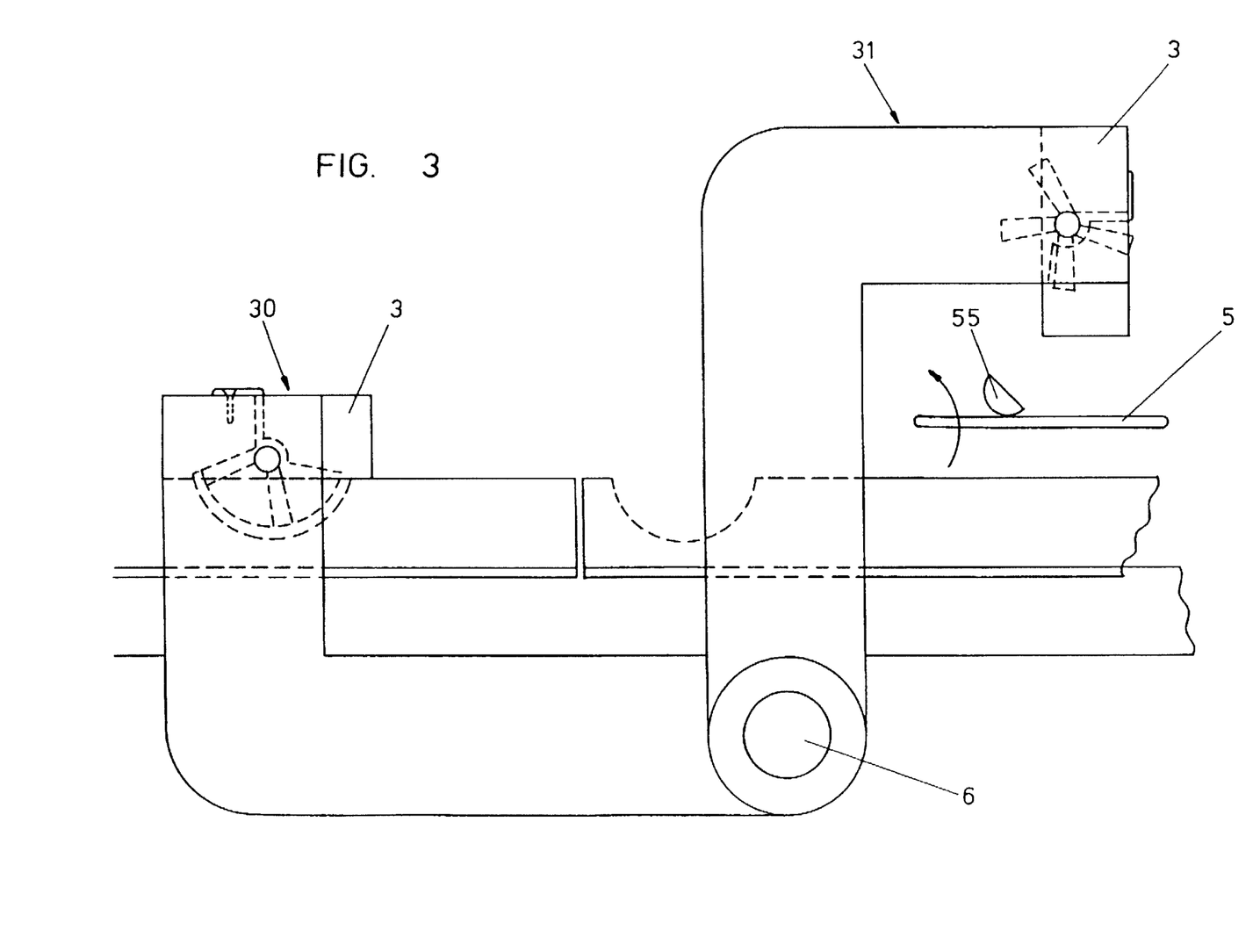
FIG. 3 shows in schematic view from one side, showing the machine in the cutting and releasing positions.

Referring to FIG. 3 of the accompanying drawings, the gantry arm 3 is shown in the first, scoop position, and the second, release position 30,31 respectively. In the scoop position 30, operation is as described herein above with reference to FIGS. 8 and 9. Once a scoop operation has been performed, the gantry arm is rotated about the pivotal axis 6, such that the gantry arm is raised to overhang the output conveyor 5, as shown in position 31 in FIGS. 2 and 3. The gantry is moved between the scoop and release positions by means of a gantry drive means, which may be a hydraulic motor, controlled by an hydraulic control means.

In the release position, as shown in FIG. 2, the cut body portions of potato 55 are released onto the exit conveyor 5 to be taken away for further processing.

When the gantry arm is in position between the scoop and release positions, the cut potato pieces are held to the gantry 3 by the support blade 63 and cutting blade 60, which are positioned under the cut potato piece and hold the cut potato piece to the gantry arm 3. In the release position, the blade is retracted in a clockwise direction as seen in FIGS. 3, to a retracted position as shown in FIG. 7. During transition from the cutting position to the retracted position, the cut potato piece falls out of the blade, under the influence of gravity.

Figure 10:
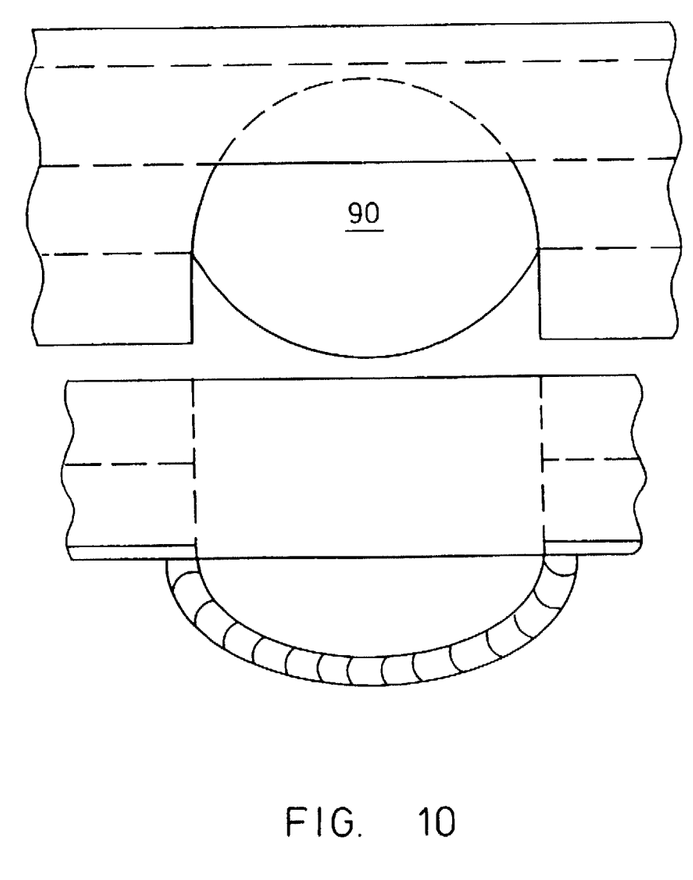
FIG. 10 shows in plan view a second embodiment blade and blade gantry portion according to a second specific embodiment of the present invention.
Figure 11:
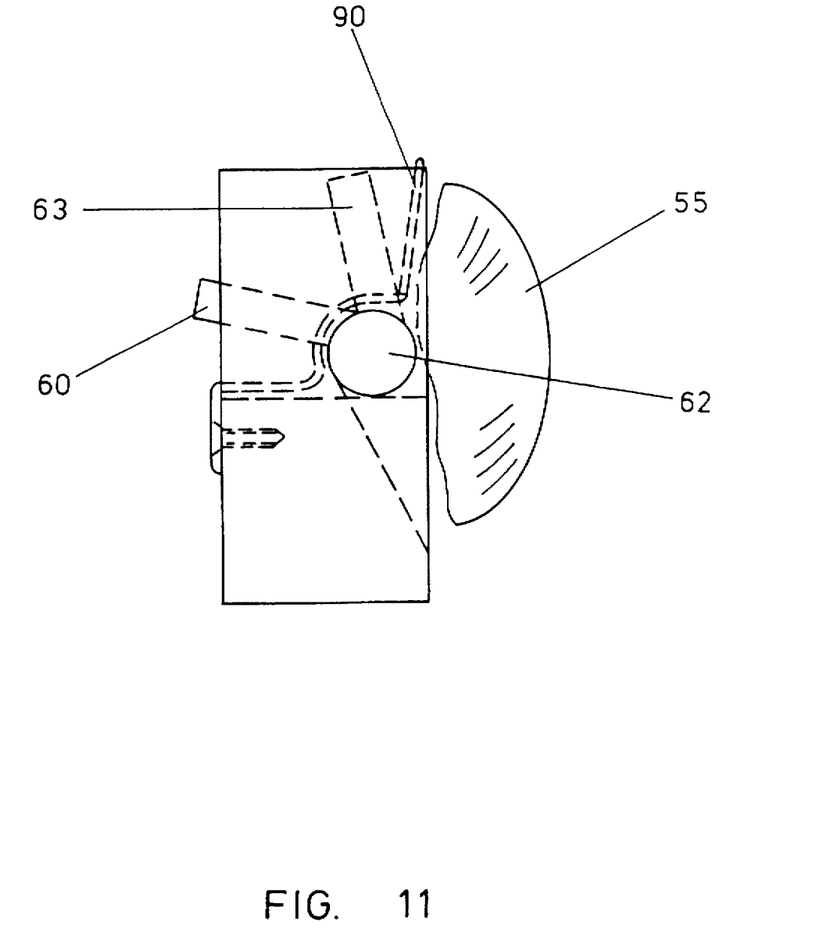
FIG. 11 shows in cut away side view, the second embodiment blade and gantry, in a release portion.

In a further modification of the blade and gantry arrangement, as shown in FIGS. 10 and 11 of the accompanying drawings, there is provided a pushing block 90 in the gantry member, the pushing block being of a substantially hemi-ellipsoidal shape, eg. resembling a half potato, which fits between the cutting blades and the support rod 62, such that when the blades are rotated into the gantry member, the pushing member 90 urges the potato piece to be pushed out from between the blades and the support rod 62. Thus, in the second embodiment, there is no need to rely on gravity to push the cut potato piece out from between the blades and the support rod, in the release position.

Referring to FIGS. 1 to 9, operation of the machine as above is repeated, to enable processing of a large volume of potatoes, a plurality of potatoes being peeled in parallel to each other.

The potatoes are fed into the machine in an array of recesses on the input conveyor. Then the gantry lowers over a tray, such that the plurality of blades, corresponding to the plurality recesses, can cut out the body portion of the potatoes in the recesses in a single rotation of the rod 62. The gantry is raised, about the pivot 61, to leave the gantry over the output conveyor, and the blades are rotated to the release position, to drop the potato bodies onto the output conveyor. The input conveyor then proceeds in stepwise fashion, such that a new tray is moved into the scoop position, the gantry is moved down over the tray, and operation as described above is repeated.

The reader's attention is directed to all papers and documents which are filed concurrently with or previous to his specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

I claim:

1. A food processing machine for separating a body of a food item, the machine comprising:

a plurality of cutting means arranged in an array, wherein each of the cutting means comprises a first arced blade having first and second ends, said arced blade being rotatable about an axis of rotation which connects the first and second ends;

a plurality of receptacles for containing a plurality of said food items, the receptacles being arranged in an array; and means for moving the cutting means between a cutting position, in which the cutting means are operable to cut a body portion from each of the food items, and a release position, in which the food items are released from the cutting means;

a support means for supporting a cut food portion during transport between said cutting and release positions, wherein said support means comprises a second arced blade having first and second ends, said second arced blade being rotatable about an axis which connects said first and second ends of said second arced blade.

2. A food processing machine as claimed in claim 1, in which the cutting means are arranged in a row, about a single axis of rotation.

3. A food processing machine as claimed in claim 2, in which the support means and cutting means are arranged to rotate about the same axis of rotation, such that the cutting means leads the support means in cutting through the body of the food item.

4. A food processing machine as claimed in claim 3, in which the array of cutting means are supported on a moveable gantry member, the moveable gantry member being moveable between the cutting and release positions.

5. A food processing machine as claimed in claim 2, such that in the release position, the cutting means and support means rotate with respect to the rotational axis, such as to release the body of the food item, under the influence of gravity.

6. A food processing machine as claimed in any one of claim 2, such that in the release position, the cutting means and support means urge a food body portion held thereby, against a pushing member, for pushing the food body away from the support means and/or cutting blade, to release the food body.

7. A food processing machine as claimed in claim 1, in which the plurality of receptacles comprise an array of recesses on a conveyor belt.

8. A food processing machine as claimed in claim 7, in which the conveyor belt moves in a series of discrete step wise movements, such as to allow location of the array of cutting means with the plurality of receptacles.

* * * * *